(12) United States Patent
Pritchard

(10) Patent No.: US 9,267,810 B2
(45) Date of Patent: Feb. 23, 2016

(54) SYSTEMS AND METHODS FOR DISPLAYING NAVIGATIONAL INFORMATION

(71) Applicant: Google Inc., Mountain View, CA (US)

(72) Inventor: Thomas Pritchard, London (GB)

(73) Assignee: Google Inc., Mountain View, CA (US)

( * ) Notice: Subject to any disclaimer, the term of this patent is extended or adjusted under 35 U.S.C. 154(b) by 201 days.

(21) Appl. No.: 13/940,556

(22) Filed: Jul. 12, 2013

(65) Prior Publication Data

US 2015/0019127 A1     Jan. 15, 2015

(51) Int. Cl.
*G01C 21/36* (2006.01)

(52) U.S. Cl.
CPC .......... *G01C 21/367* (2013.01); *G01C 21/3691* (2013.01)

(58) Field of Classification Search
CPC . G01C 21/3691; G01C 21/367; G09B 29/102
See application file for complete search history.

(56) References Cited

U.S. PATENT DOCUMENTS

| | | | |
|---|---|---|---|
| 5,450,343 A | 9/1995 | Yurimoto et al. | |
| 5,732,385 A * | 3/1998 | Nakayama et al. | 701/437 |
| 6,070,124 A | 5/2000 | Nimura et al. | |
| 6,529,822 B1 * | 3/2003 | Millington et al. | 701/410 |
| 6,654,024 B1 | 11/2003 | Volkel | |
| 6,771,189 B2 | 8/2004 | Yokota | |
| 7,269,504 B2 | 9/2007 | Gardner et al. | |
| 7,308,359 B1 | 12/2007 | Krull et al. | |
| 7,451,041 B2 | 11/2008 | Laumeyer et al. | |
| 8,099,108 B2 * | 1/2012 | Camp et al. | 455/456.3 |
| 8,335,646 B2 | 12/2012 | Nesbitt | |
| 8,350,845 B2 | 1/2013 | Soulchin et al. | |
| 8,364,392 B2 | 1/2013 | Chao | |
| 8,370,058 B2 | 2/2013 | Waeller et al. | |
| 8,670,926 B2 * | 3/2014 | Zhang | 701/409 |
| 8,731,818 B2 * | 5/2014 | Kuenzner et al. | 701/410 |

(Continued)

FOREIGN PATENT DOCUMENTS

| | | |
|---|---|---|
| EP | 1801764 | 6/2007 |
| JP | 2004317417 | 11/2004 |

OTHER PUBLICATIONS

Lee et al., "Iterative Design of MOVE: a Situationally Appropriate Vehicle Navigation System", International Journal of Human-Computer Studies, vol. 66, Issue 3, Mar. 2008, pp. 198-215.*

(Continued)

*Primary Examiner* — Todd Melton
(74) *Attorney, Agent, or Firm* — Dority & Manning, P.A.

(57) ABSTRACT

Systems and methods for displaying navigational information are provided. An exemplary navigational device can include a processor, a memory, a user interface, a positioning system, and a network interface. The processor can adjust a scale of a map displayed on the display to reflect the minimum of a first distance that can be travelled over a period of time at a current speed, a second distance between the current position of the navigational device and a first location at which a driving maneuver should be performed, and a third distance between the current position of the navigational device and a second location at which a traffic condition exists. An exemplary method includes adjusting a map based on a comparison of a plurality of horizons respectively providing distances beyond which navigational information is less useful.

19 Claims, 6 Drawing Sheets

(56) References Cited

U.S. PATENT DOCUMENTS

| | | |
|---|---|---|
| 2006/0074553 A1 | 4/2006 | Foo et al. |
| 2008/0275645 A1 | 11/2008 | Hoshino |
| 2009/0005961 A1 | 1/2009 | Grabowski et al. |
| 2011/0032105 A1 | 2/2011 | Hoffman et al. |
| 2011/0172917 A1 | 7/2011 | Muzina et al. |
| 2011/0301842 A1 | 12/2011 | Krupansky et al. |
| 2012/0215441 A1 | 8/2012 | Hayakawa |
| 2013/0018571 A1 | 1/2013 | Miwa |
| 2013/0035854 A1 | 2/2013 | Zhang |
| 2014/0244165 A1* | 8/2014 | Bells .............................. 701/455 |

OTHER PUBLICATIONS

Wu et al., "Identifying Proper Scales on Digital Maps for In-Vehicle Navigation Systems", Universal Access in Human-Computer Interaction, 2009, pp. 262-270.*

International Search Report mailed Oct. 20, 2014—4 pages.

* cited by examiner

SYSTEMS AND METHODS FOR DISPLAYING NAVIGATIONAL INFORMATION

FIELD

The present disclosure relates generally to providing navigational instructions. In particular, the present disclosure relates to systems and methods for adjusting the scale of a map displayed on a navigational device.

BACKGROUND

Navigational devices are becoming increasingly commonplace in the modern world. For example, navigational devices can be used for navigating a vehicle such as a car, boat, or airplane or for use when walking through an unfamiliar location. In particular, as smartphones, tablets, or other computing devices become increasingly able to determine their own position in the world using GPS or other positioning systems, navigational devices are no longer limited to devices specifically designed with the sole-purpose of providing navigational instructions. Instead, navigational devices can include a large variety of computing devices that can run one or more applications to provide near instantaneous instructions for navigating from almost any location to any other location.

In particular, such applications often offer "turn-by-turn" navigational instruction, which provides navigation over a sequence of driving maneuvers. Such instruction can be overlaid on a map that depicts the user's surroundings. Further, an indicator can be provided on the map to show the relative position of the navigational device. Text may be provided that lists the distance to the next driving maneuver.

However, such display methods implemented by current navigational devices can fail to provide users with an intuitive, accurate sense of the scale of displayed map. For example, a user of a current navigational product may be presented a single, unchanging stylization of the map, despite the fact that such map is presented at varying scales. As another example, the user may be unable to mentally convert the textual distance information into a full comprehension of the physical distance or may be distracted by extraneous information.

Furthermore, recent research has shown that users of current navigational products travel longer distances, make more stops, and commit more direction errors than traditional paper map users. Thus, users of current navigational products are failing to comprehend the scale of the provided map or the immediacy of the provided navigational instruction.

SUMMARY

Aspects and advantages of the invention will be set forth in part in the following description, or may be obvious from the description, or may be learned through practice of the invention.

One aspect of the present disclosure is directed to a navigational device for providing navigational instructions. The navigational device can include a processor, a memory, and a user interface that includes a display. The navigational device can also include a positioning system for determining a current position of the navigational device and a network interface for receiving data from a remote computing device. The processor of the navigational device can adjust a scale of a map displayed on the display to reflect the minimum of a first distance that can be travelled over a period of time at a current speed at which the navigational device is travelling, a second distance between the current position of the navigational device and a first location at which a driving maneuver should be performed according to the navigational instructions, and a third distance between the current position of the navigational device and a second location at which a traffic condition exists. The second location can be located along a route of travel suggested by the navigational instructions.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
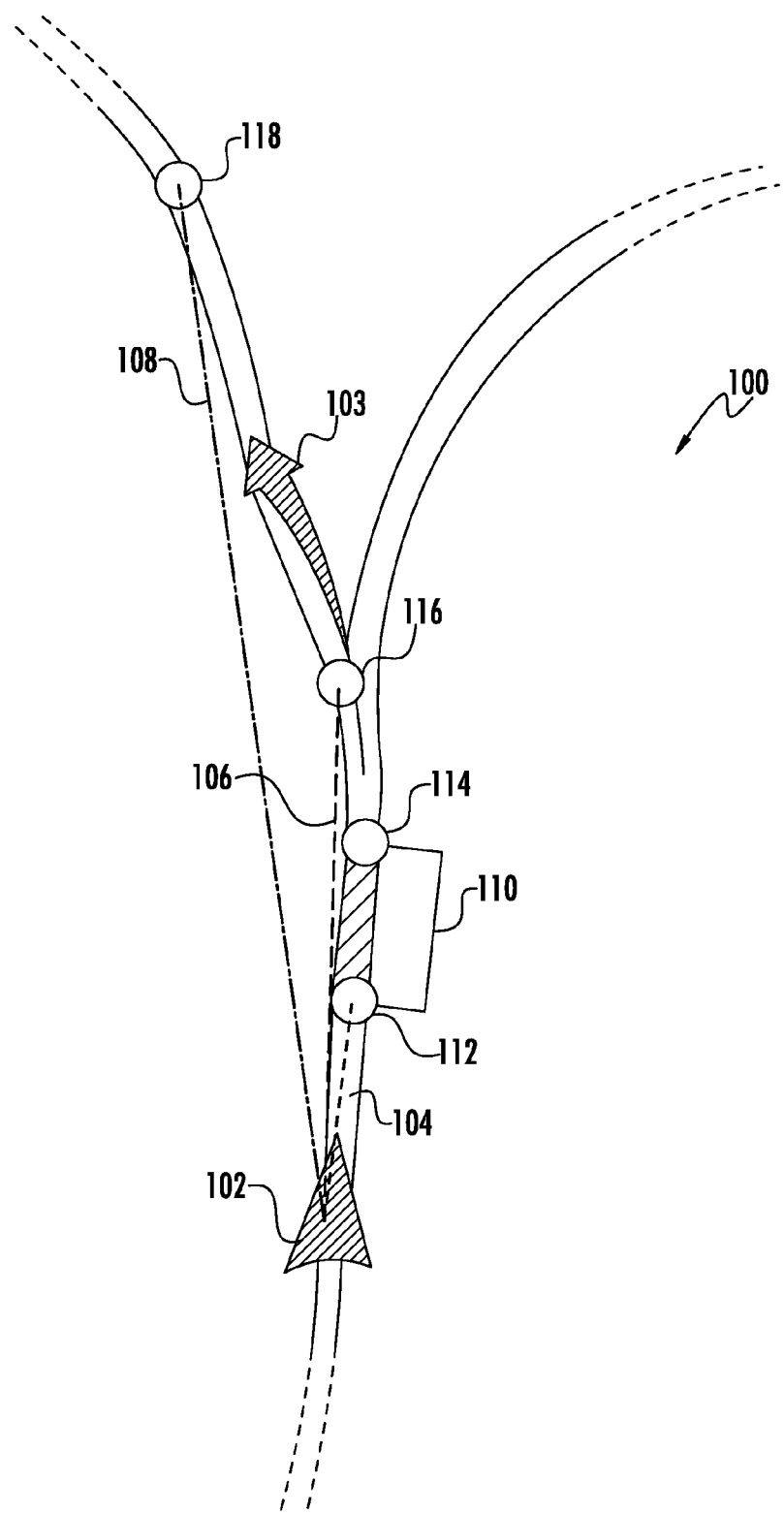
FIG. 1 depicts an exemplary map according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for determining an appropriate map scale, level of detail, and relative position of a device location indicator to be provided by a navigational device during navigational instruction. In particular, per present subject matter, the scale of a displayed map can be adjusted based on a plurality of "horizons" respectively providing distances beyond which information is less useful for navigational purposes. For example, a speed horizon, an event horizon, and a traffic horizon can be respectively calculated based on the speed at which the navigational device is travelling, an upcoming navigational event, and traffic data. The scale of the map displayed by the device can be adjusted based on such horizons. As an example, the scale of the map can be continuously modulated so as to reflect the current minimum distance provided by one of such plurality of horizons. Further, the level of detail or position of a device location indicator provided by the navigational device can be adjusted based on map scale or other factors such as current road category (e.g. interstate, state highway, or residential street).

A speed horizon can be determined based on a speed at which a navigational device is travelling. For example, the speed horizon can be generally proportional to current speed being traveled. Thus, the faster the navigational device is travelling, the greater the distance provided by the speed horizon and vice versa.

As an example, the speed horizon can be a function of current speed. For example, the speed horizon can be equal to current speed in miles per hour multiplied by 0.0833 hours. Therefore, the speed horizon can equate to an expected distance to be travelled in 5 minutes. However, more complex formulations can be used that more accurately encapsulate the relationship between useful navigational knowledge and current speed.

The event horizon can generally equal the distance remaining to the next navigational event. For example, navigational instructions can include a plurality of navigational events such as a turn or other required or suggested driving maneuver. Thus, as a user approaches a navigational event the event horizon decreases correspondingly.

The traffic horizon can generally equal the distance to the next region of traffic congestion. In particular, notifying a driver of upcoming traffic congestion can help to prevent accidents, mentally prepare the driver for frustration, or plan modified routes or detours in advance. Thus, as a user approaches a region of traffic congestion the traffic horizon decreases correspondingly.

In one implementation, the traffic horizon is equal to the distance to the beginning of the traffic congestion (i.e. the closest point of traffic congestion with respect to the user receiving navigational instruction. In another implementation, the traffic horizon incorporates information regarding the total length of the traffic congestion such that a user is given an indication of whether the traffic congestion would cause a relatively small increase in travel time or whether the traffic congestion is more extensive such that a modified route should be considered.

The ultimate map scale displayed by the navigational device can be determined based on the calculated speed, event, and traffic horizons. As an example, the map scale can reflect the horizon of smallest magnitude, which will change over time. In such fashion, the user is consistently alerted to the most relevant upcoming information. As another example, a user can input preferences such that the map scale is determined after considering the user preferences.

According to another aspect of the present disclosure, the level of detail provided by the map display can be adjusted based on map scale and other factors such as current road category (e.g. interstate, state highway, city street, or residential street). For example, when travelling on an interstate the level of detail provided on the map display can be limited to interstate exits and major or visually commanding points of interest. On the other hand, when travelling on a city street, the level of detail can include relatively minor details such as surrounding road names, business names, or other visually unique identifiers. In such fashion, the user is given a more accurate sense of the importance of being aware of surrounding features and is therefore more confident in travelling. Current map scale can be used together with such road category information to determine the appropriate level of detail.

According to yet another aspect of the present disclosure, the position within the display of an indicator representative of the location of the navigational device can be adjusted based on map scale and other factors such as current road category. For example, when travelling on an interstate it can be useful to dedicate a larger portion of the screen to showing the upcoming route. Therefore, the position of the device location indicator can be maintained towards a boundary of the display (e.g. at the bottom of the display area), while the upcoming route is shown in the remainder of the display area. On the other hand, when travelling on a city street, it can be useful to provide a complete 360 degree depiction of the area surrounding the user's vehicle. Therefore, the device location indicator can be positioned at a center region of the display area. Current map scale can be used together with road category information to determine the appropriate position of the indicator.

With reference now to the FIGS., exemplary embodiments of the present disclosure will now be discussed in detail. FIG. 1 depicts an exemplary map 100 according to an exemplary aspect of the present disclosure. In particular, a device location indicator 102 and navigational instruction 103 are overlaid on map 100.

Device location indicator 102 can indicate the position or location of a navigational device with respect to map 100. For example, the navigational device can include a positioning system (e.g. a Global Positioning System) and such positioning system can be used to determine the current location, speed, and/or heading of such navigational device. It will be appreciated, however, that device location indicator 100 can alternatively represent the location of a vehicle being navigated by the navigational device or the location of a user of the navigational device. Generally, however, indicator 102 is provided for the purposes of explaining aspects of FIG. 1.

Navigational instruction 103 can indicate a location at which a navigational event is scheduled or recommended to occur. For example, a user of a navigational device can request navigational instructions to assist in travelling from an origin to a destination. Navigational instructions can be provided in response to such request and can include a planned route of travel featuring a plurality of navigational events such as recommended driving maneuvers. Navigational instruction 103 can be provided to such user in order to visually indicate the location of an upcoming navigational event. For example, as shown in FIG. 1, navigational instruction 103 can instruct a user currently located at the location indicated by indicator 102 to perform a driving maneuver at location 116 (e.g. bear left).

Also depicted in FIG. 1 are a traffic horizon 104, an event horizon 106, and a speed horizon 108. According to aspects of the present disclosure, a user of a navigational device should be able to see the most relevant information at all times. However, what navigational information is most relevant will vary depending on a number of factors. Therefore, each of traffic horizon 104, event horizon 106, and speed horizon 108 can respectively provide a distance beyond which navigational information is less useful for navigational purposes and the scale of a provided map can be adjusted based on such horizons.

Speed horizon 108 can provide or describe a first distance. Such first distance can represent the horizon of useful navigational knowledge based on the speed at which the navigational device is travelling. It will be appreciated that, in the instance in which the navigational device is located in the vehicle being navigated, the speed at which the navigational device is travelling is generally equivalent to a speed at which such vehicle is travelling.

Generally, the first distance provided by speed horizon 108 can be proportional to the speed at which the device is travelling. In particular, as a user receiving navigational instructions increases her speed, the distance at which knowledge becomes less useful also increases and vice versa. For example, the distance at which navigational information becomes less useful is much greater for a user travelling at 70 MPH on a highway than a user travelling at 7 MPH along a residential road. As such, it may be useful for the user travelling at 70 MPH to be presented with 10 miles worth of map while it may be more useful for the user travelling at 7 MPH to be presented with 0.5 miles worth of map. Therefore, speed horizon 108 can increase and decrease proportionally with device speed.

As an example, the first distance provided by speed horizon 108 can be based solely on the speed at which the navigational device is travelling, without considering a planned route of travel or other trip-specific variables. For example, a speed function can output the first distance as a function of the device speed. Thus, if the device is travelling at 70 MPH, the first distance provided by speed horizon 108 can be 10 miles, regardless of whether or not there are planned upcoming navigational events, road changes, direction changes, etc.

Any suitable speed function can be used to satisfy the present disclosure. In one implementation, the speed function multiplies the speed expressed in MPH by a given time to determine the first distance. However, more complex speed functions can be used which more accurately encapsulate the relationship between useful navigational knowledge and current speed. For example, in some implementations the speed function can be exponential, logarithmic, differential, complex, or any other suitable expression or function.

As another example, speed horizon 108 can take into account a planned route of travel. For example, the first distance provided by speed horizon 108 can be the distance between the location of the device (indicated by 102) and a location 118, as depicted in FIG. 1.

Location 118 can be a location that is traversed by the planned route of travel and is expected to be reached over a period of time at the current speed at which the navigational device is travelling. For example, location 118 can be expected to be reached in 5 minutes given the current speed at which the device is travelling and the planned route of travel. In one implementation, such period of time can be predetermined and programmed into device memory.

In some implementations of the present disclosure, speed horizon 108 can describe the distance between the location of the device (indicated by 102) and location 118 in terms of a linear distance between such two locations, as shown in FIG. 1. However, in other implementations of the present disclosure, speed horizon 108 can describe the distance between the location of the device (indicated by 102) and location 118 in terms of a distance to be traveled between such two locations along the planned route of travel. A system implementing the present disclosure can be designed to properly process either of such formats.

Location 118 can be determined based on the current speed, location, and heading of the navigational device and the planned route of travel. In one implementation, location 118 is determined by advancing along the planned route of travel from the current location of the navigational device (indicated by 102) by an amount of travel equal to the current speed multiplied by a predetermined period of time. In other implementations, additional routing information is considered, including, for example, expected travel times, average travel times, speed limits, or other information associated with the planned route of travel such that location 118 represents a more informed estimation of the location the navigational device will reach after the predetermined period of time.

Thus, speed horizon 108 can take various formats, including, without limitation, a raw distance based solely on the current speed of the vehicle, a linear distance from the current location of the device to an expected location along the planned route of travel to be reached given the current speed of the device over a period of time (shown in FIG. 1), a travel-based distance to the expected location, or some combination thereof, or other suitable distances or formats.

Event horizon 106 can describe or provide a second distance. Such second distance can represent the horizon of useful navigational knowledge based on the presence or location of one or more upcoming navigational events. As an example, the second distance provided by event horizon 106 can generally equal the distance remaining to the next navigational event.

For example, as discussed above, navigational instructions from an origin to a destination can include a planned route of travel that includes a plurality of navigational events, such as the recommended driving maneuver indicated by navigational instruction 103. Thus, event horizon 106 can describe the remaining distance from the current position of the navigational device to the next or most proximate of such navigational events.

As shown in FIG. 1, the second distance provided by event horizon 106 can generally equal the distance between the current location of the device as indicated by indicator 102 and the next navigational event, shown at location 116. Thus, as the navigational device approaches the navigational event, event horizon 106 will be accordingly reduced. In such fashion, a user of the navigational device can easily see where the navigational event is located and mentally prepare for the recommended driving maneuver.

Similar to speed horizon 108, event horizon 106 can express the distance remaining to the next navigational event in terms of a linear distance between the current location of the device and the location of the navigational event, as shown in FIG. 1. Alternatively, event horizon 106 can express such distance in terms of a travel-based distance between such two locations which describes an actual amount of distance to be travelled according to the planned route of travel.

Traffic horizon 104 can describe or provide a third distance. Such third distance can represent the horizon of useful navigational knowledge based on traffic data describing current traffic conditions. As an example, the third distance can generally equal the distance from the current position of the navigational device to an existing traffic condition.

For example, as shown in FIG. 1, traffic horizon 104 can describe a third distance from the location indicated by indicator 102 to a traffic condition 110. Traffic condition 110 can be any traffic condition of which knowledge would be useful to a user of the navigational device. For example, traffic condition 100 can be a region of high traffic congestion, a road closure, a checkpoint, a detour, a traffic incident, or other suitable traffic condition.

As shown in FIG. 1, the third distance provided by traffic horizon 104 can generally equal the distance between the current location of the device as indicated by indicator 102 and the most proximate, with respect to the current location of the device, point along the planned route of travel at which traffic condition 110 exists, shown in FIG. 1 as location 112. Thus, as the navigational device approaches location 112, traffic horizon 104 will be accordingly reduced. In such fashion, a user of the device can easily see where the traffic condition begins and mentally prepare for navigational complications such as traffic delays or modified routes.

Similar to speed horizon 108 and event horizon 106, traffic horizon 104 can express the distance remaining to the most proximate point at which the traffic condition exists in terms of a linear distance between the current location of the device and the most proximate point at which the traffic condition exists, as shown in FIG. 1. Alternatively traffic horizon 104 can express such distance in terms of a travel-based distance between such two locations which describes an actual amount of distance to be travelled according to the planned route of travel.

In some implementations, traffic horizon 104 can include further information regarding the extent of traffic condition 110. As an example, traffic horizon 104 can describe a fourth distance between the current position of the navigational device (indicated by 102) and location 114 which is the least proximate position along the planned route of travel at which traffic condition 110 exists.

According to an aspect of the present disclosure, whenever a traffic condition exists, a navigational device implementing the present disclosure can provide a user with an option to display the least proximate location at which a traffic condition exists, shown in FIG. 1 as location 114. In particular, by displaying the full extent of traffic condition 110, a user can be given an indication of whether the traffic congestion is expected to cause a relatively minor increase in travel time or whether the traffic congestion is more extensive such that a modified route should be considered.

According to another aspect of the present disclosure, the scale of a map provided on the display of the navigational device can be adjusted based on the plurality of horizons discussed above. For example, traffic horizon 104, event horizon 106, and speed horizon 108 can be compared and the scale of the map can be adjusted based upon such comparison.

As an example, the scale of the map can be adjusted such that it reflects the minimum of the first, second, and third distances respectively provided by traffic horizon 104, event horizon 106, and speed horizon 108. For example, in the instance depicted in FIG. 1, the scale of the map could be adjusted such that it reflected the third distance provided by traffic horizon 104: the distance between the current location of the device (indicated by 102) and the most proximate point along the route of travel at which a traffic condition exists (location 112). Systems and methods for adjusting the scale of the map will be discussed further below.

Figure 2:
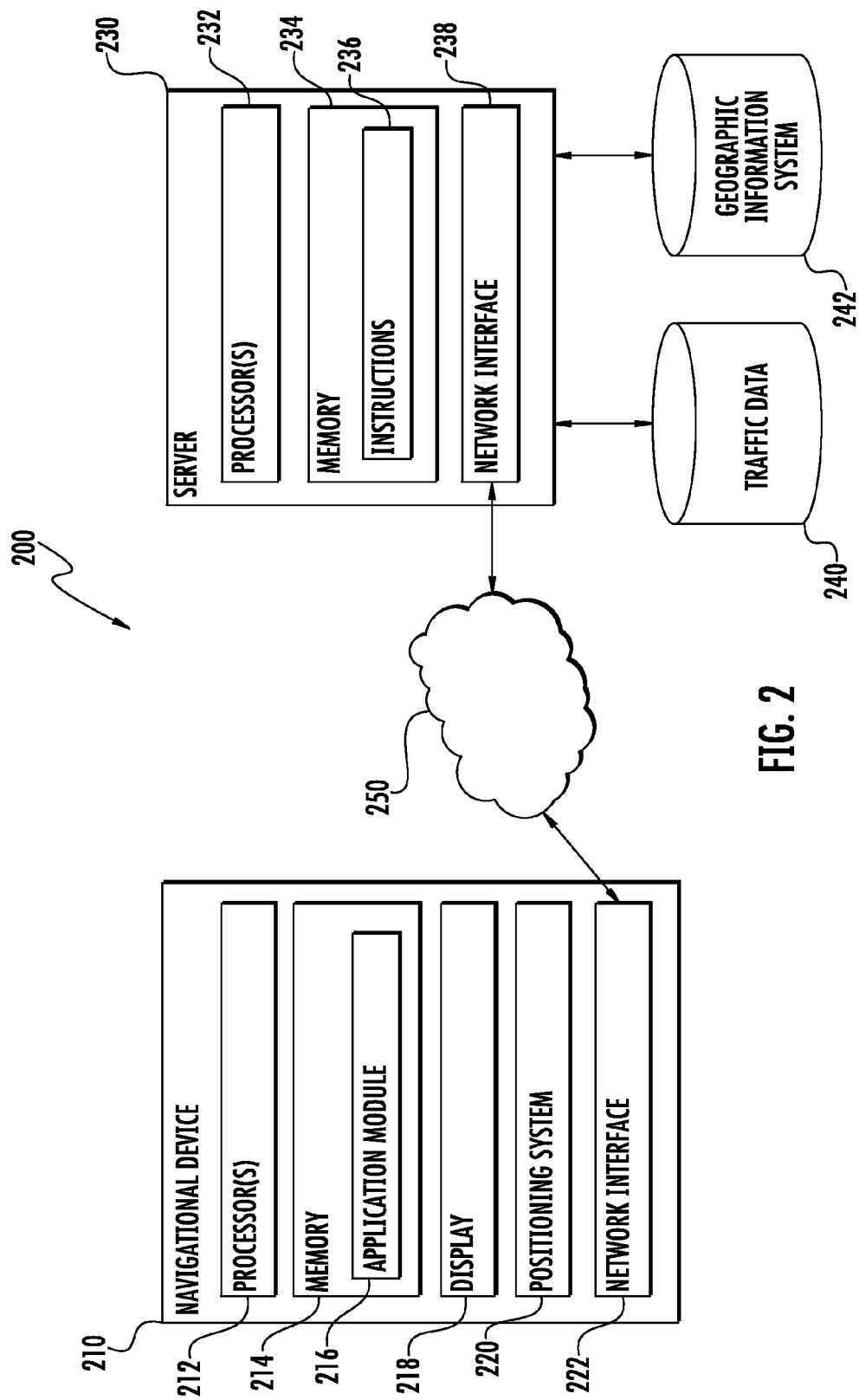
FIG. 2 depicts an exemplary navigational system according to an exemplary embodiment of the present disclosure.

FIG. 2 depicts an exemplary navigational system 200 according to an exemplary embodiment of the present disclosure. Navigational system 200 includes a navigational device 210 in communication with a server 230 over a network 250. Although a single navigational device 210 is depicted, navigational system 200 can include a client-server architecture in which any number of navigational devices can be connected to server 230 over network 250.

Navigational device 210 can be any suitable device used for navigation, including a sole-purpose navigational device, a smartphone, a tablet, a laptop, a PDA, a device installed within a dashboard of a vehicle, or any other suitable device. Navigational device 210 can include one or more processor(s) 212, a memory 214, a display 218, a positioning system 220, and a network interface 222.

The processor(s) 212 can be any suitable processing device, such as a microprocessor, microcontroller, integrated circuit, or other suitable processing device. The memory 214 can include any suitable computing system or media, including, but not limited to, non-transitory computer-readable media, RAM, ROM, hard drives, flash drives, or other memory devices. The memory 214 can store information accessible by processor(s) 212, including instructions that can be executed by processor(s) 212. The instructions can be any set of instructions that when executed by the processor(s) 212, cause the processor(s) 212 to provide desired functionality.

In particular, in some devices, memory 214 can store an application module 216. Navigational device 210 can implement application module 216 to execute aspects of the present disclosure, including directing communications with server 230 and providing navigational instructions to a user.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or optical or magnetic media.

Memory 214 can also include data, such as geographic data, that can be retrieved, manipulated, created, or stored by processor(s) 212. In some implementations, such data can be accessed and used to generate maps and navigational instructions.

The navigational device 210 can also include a positioning system 220 that can be used to identify the position of the navigational device 210. The positioning system 220 can be any device or circuitry for monitoring the position, speed, and/or heading of the navigational device 210. For example, the positioning system 220 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

The navigational device 210 can include various input/output devices for providing and receiving information from a user, such as a touch screen, touch pad, data entry keys, speakers, mouse, and/or a microphone suitable for voice recognition. For instance, the navigational device 210 can use display 218 to present information to the user, including navigational instructions overlaid on a map.

Network interface 222 can be any suitable device or circuitry for providing communications across network 250. For example, network interface 222 can include one or more of a receiver, a transmitter, an antenna, a demodulator, a port, or other suitable components.

The navigational device 210 can exchange data with one or more servers 230 over the network 250 via network interface 222. Server 230 can be any suitable form of server or other computing device configured to supply navigational device 210 with the appropriate information. In particular, in some implementations, multiple servers are accessed by navigational device 210 to procure the desired information or functionality.

Similar to navigational device 210, server 230 can include a processor(s) 232, a memory 234, and a network interface 238. The memory 234 can store information accessible by processor(s) 232, including instructions 236 that can be executed by processor(s) and data.

Server 230 can include or be in communication with one or more databases, including a traffic database 240 and/or a geographic information system 242. Server 230 can access databases 240 and 242 over a LAN, WAN, or other suitable computing construct.

Traffic database 240 can store or provide data describing real-time or daily traffic conditions. For example, traffic database 240 can provide data describing the locations of any current traffic stoppages, congestions, or other traffic conditions.

Geographic information system 242 can store or provide geographic data, including map data, point of interest data, road categorization data, or other suitable data. In some implementations, server 230 can use data obtained from geographic information system 242 to determine and provide navigational instructions from an origin to a destination.

The network 250 can be any type of communications network, such as a local area network (e.g. intranet), wide area network (e.g. Internet), or some combination thereof. In general, communication between the navigational device 210 and server 230 can be carried via network interface using any type of wired and/or wireless connection, using a variety of communication protocols (e.g. TCP/IP, HTTP), encodings or formats (e.g. HTML, XML), and/or protection schemes (e.g. VPN, secure HTTP, SSL).

Figure 3:
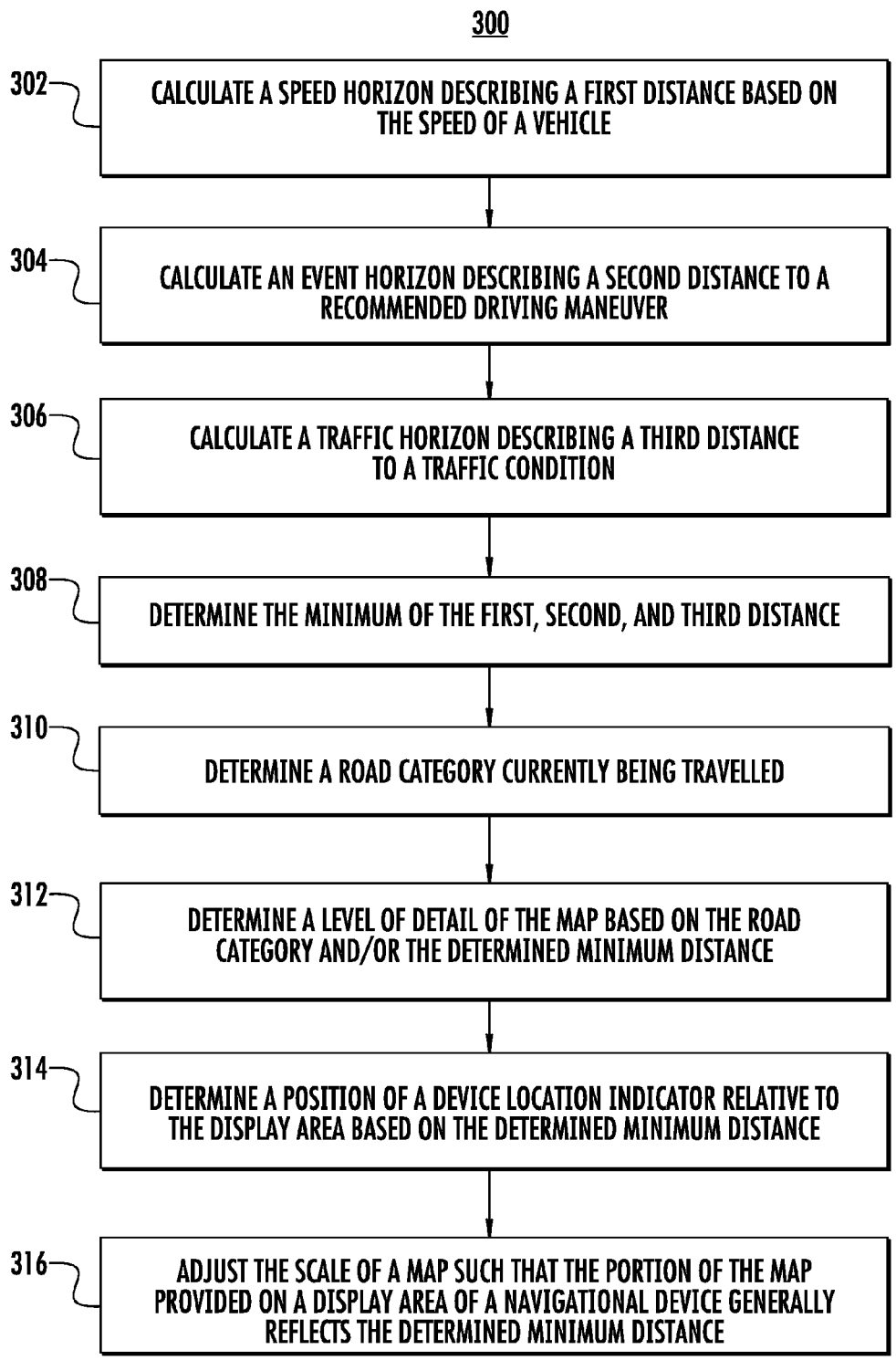
FIG. 3 depicts a flowchart of an exemplary method for displaying navigational information on a display area of a navigational device according to an exemplary embodiment of the present disclosure.

FIG. 3 depicts a flowchart of an exemplary method (300) for displaying navigational information on a display area of a navigational device according to an exemplary embodiment of the present disclosure. While method (300) will be discussed with reference to navigational system 200 of FIG. 2, method (300) can be implemented using any suitable navigational device or system. In addition, FIG. 3 depicts steps performed in a particular order for purposes of illustration and discussion. Those of ordinary skill in the art, using the disclosures provided herein, will understand that the various steps of any of the methods disclosed herein can be omitted, adapted, and/or rearranged in various ways.

At (302) a speed horizon can be calculated based on the speed of a vehicle. The speed horizon can describe a first distance. For example, navigational device 210 can implement positioning system 220 to track its position over time to determine a current speed. Alternatively, the current speed of the vehicle can be provided to navigational device 210 by the vehicle itself. Navigational device 210 can calculate the first distance described by the speed horizon based on the speed of the vehicle.

For example, the speed horizon can be calculated at (302) by entering the current speed of the vehicle into a speed formula and obtaining a raw distance as an output. As another example, the speed horizon can be calculated at (302) by advancing along a planned route of travel by an amount of travel expected to be completed over a predetermined period of time given the current speed of the vehicle. Thus, the first distance provided by the speed horizon can be equal to the distance between the current location of the device and a location expected to be reached after such predetermined period of time.

At (304) an event horizon can be calculated. The event horizon can describe a second distance to a recommended driving maneuver. For example, navigational device 210 can assist a user in navigating from an origin to a destination by providing a series of navigational instructions including a plurality of recommended driving maneuvers. Thus, the event horizon can be calculated at (304) by determining a distance remaining from the current location of the device to the location of the next or most proximate of such recommended driving maneuvers.

At (306) a traffic horizon can be calculated. The traffic horizon can describe a third distance to a traffic condition. For example, server 230 can obtain real-time traffic data from traffic database 240 and transmit such traffic data to navigational device 210 over network 250. Navigational device 210 can analyze the received traffic data to determine whether a traffic conditions exists in the upcoming planned route of travel. Thus, the traffic horizon can be calculated at (306) by determining a distance between the current location of the device and the most proximate location along the planned route of travel at which a traffic condition exists.

At (308) the minimum of the first distance, second distance, and third distance can be determined. For example, processor(s) 212 of navigational device 210 can compare the first, second, and third distances to determine the minimum of such distances.

At (310) a road category can be determined. The road category can categorize or otherwise describe the roadway currently being traveled. For example, navigational device 210 can query server 230 regarding the road category of the roadway currently being traveled. Server 230 can access geographic information system 242 to determine the current road category and can provide such information to navigational device 210 over network 250. Alternatively, such road category data can be included in memory 214 of navigational device 210 and accessed at (310).

The road category determined at (310) can be any categorization that would enhance the ability of navigational device 210 to tailor the information provided to the user such that the navigational instructions are displayed in a more intuitive fashion. Exemplary road categories include, without limitation, interstate highway, state highway, city avenue or boulevard, small city street, residential street, bicycle path, pedestrian walkway, one-way street, private property, federal property, speed-limit categorizations, or other suitable road categories.

At (312) an appropriate level of detail can be determined for a map provided on a display area of the device. In particular, the level of detail can be determined based on either or both of the minimum distance determined at (308) or the road category determined at (310).

Thus, according to aspects of the present disclosure, a map having a high level of detail can be provided when the minimum distance determined at (308) is relatively small (e.g. less than one mile), while a map having a lesser level of detail can be provided when the minimum distance determined at (308) is relatively large (e.g. greater than five miles).

Likewise, a map having a high level of detail can be provided when the road category determined at (310) is a lesser road, such as a residential street, while a map having less extraneous detail can be provided when the road category determined at (310) is a larger road, such as an interstate highway. Further, it will be appreciated that the level of detail determined at (312) can be adjusted as a continuous scale or can be adjusted in a stepwise fashion.

Figure 5:
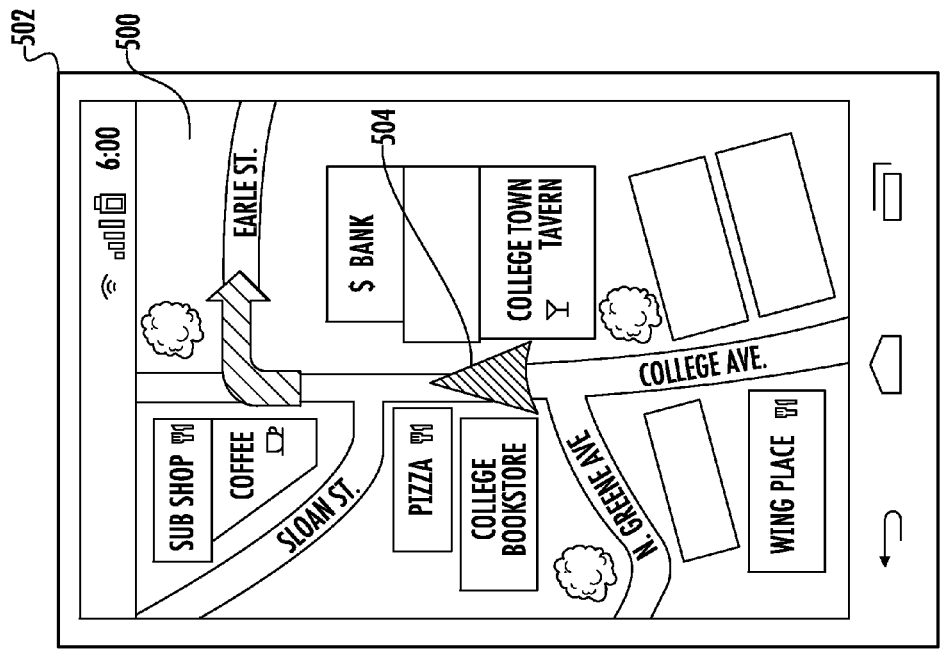
FIG. 5 depicts an exemplary map displayed on an exemplary navigational device according to an exemplary embodiment of the present disclosure.
Figure 4:
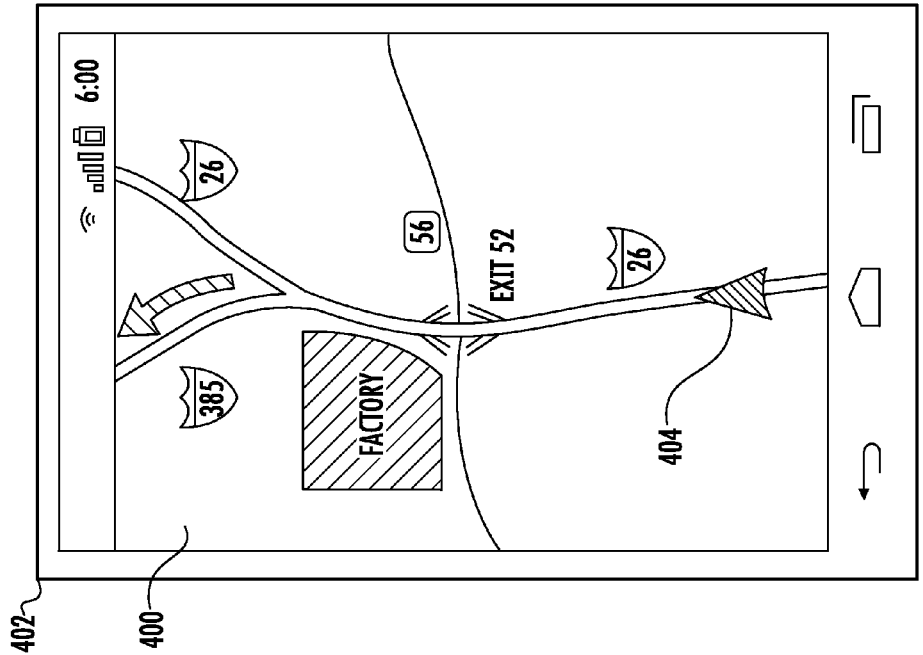
FIG. 4 depicts an exemplary map displayed on an exemplary navigational device according to an exemplary embodiment of the present disclosure.

For example, FIGS. 4 and 5 respectively depict exemplary maps 400 and 500 displayed on exemplary navigational devices 402 and 502 according to exemplary embodiments of the present disclosure. More particularly, map 400 provides an example of a map having a low level of detail while map 500 provides an example of a map having a high level of detail.

As depicted in FIG. 4, map 400 is provided for a vehicle travelling upon an interstate highway. Map 400 includes icons indicating interstate numbers, the identity of the road available at the upcoming exit, an upcoming exit number, an upcoming navigational instruction, and one visually commanding point of interest—a large factory. However, few other details are provided. In addition, any other features or points of interest depicted could be shown in a softened, faded, or otherwise muted fashion. Thus, the details presented on map 400 reflect the signage and relative importance of details to a user of device 402 whom is travelling on an interstate.

As depicted in FIG. 5, map 500 is provided for a vehicle travelling upon a small city street. Map 500 includes a high level of detail, including, for example, street names, depictions of points of interest, point of interest titles and icons, foliage or terrain, and a navigational instruction. Any further details that would help a user navigate within a close range can also be provided. Thus, the details presented on map 500 reflect signage and relative importance of details to a user of device 502 whom is travelling on a small city street.

Returning to FIG. 3, at (314) an appropriate position of a device location indicator relative to the display area of the navigational device can be determined. In particular, the position of the device location indicator can be determined based on either or both of the minimum distance determined at (308) or the road category determined at (310).

Thus, according to aspects of the present disclosure, the device location indicator can be positioned at or closer to a lower boundary of the device display when the minimum distance determined at (308) is relatively large (e.g. greater than five miles). On the other hand, the device location indicator can be positioned at or closer to a center region of the device display when the minimum distance determined at (308) is relatively small (e.g. less than one mile). Likewise, the device location indicator can be closer to the lower boundary when the road category determined at (310) is a larger road and positioned closer to the center region when the road category determined at (310) is a smaller or lesser road.

For example, as shown in FIG. 4, because device 402 is travelling upon an interstate highway at a high speed, a device location indicator 404 can be positioned closer to the lower boundary of the display area of device 402. Likewise, as shown in FIG. 5, because device 502 is travelling upon a small city street at a low speed, a device location indicator 504 can be positioned at a center region of the display area of device 502. Further, device location indicator 404 can be presented in a smaller size to mimic the decreased scale of map 400 while device location indicator 504 can be presented in a larger size to mimic the increased scale of map 500.

Returning to FIG. 3, at (316) the scale of the map can be adjusted such that the portion of the map provided on the display area of the navigational device generally reflects the minimum distance determined at (308). For example, processor 212 of navigational device 210 can increase or decrease the scale of the map (i.e. zoom-in or zoom-out) such that the displayed portion of such map reflects the minimum distance. Particular exemplary implementations for adjusting the scale of a map to reflect a determined minimum distance will now be discussed with reference to FIG. 6.

Figure 6:
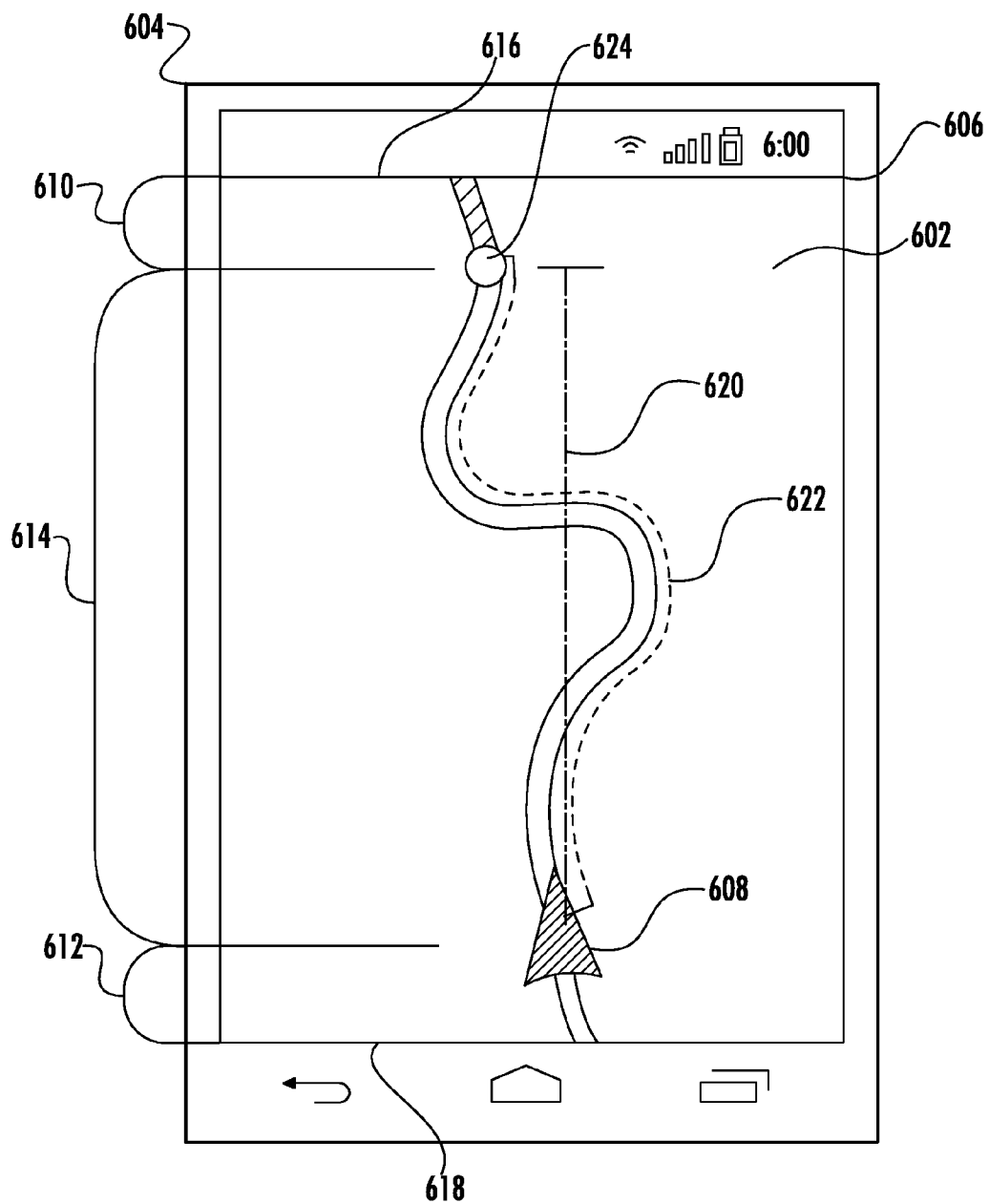
FIG. 6 depicts an exemplary map displayed on an exemplary navigational device according to an exemplary embodiment of the present disclosure.

FIG. 6 depicts an exemplary map 602 displayed on an exemplary navigational device 604 according to an exemplary embodiment of the present disclosure. In particular, map 602 is provided on a display area 606 of device 604. Overlaid on map 604 is a device location indicator 608.

In some implementations, as shown in FIG. 6, display area 606 can include an upper buffer 610, a lower buffer 612, and a center portion 614. Upper buffer 610 and lower buffer 612 can respectively include predetermined amounts of the display area 606. For example, upper buffer 610 can include a predetermined amount of area below an upper boundary 616 of display area 606. Likewise, lower buffer 612 can include a predetermined amount of area above a lower boundary 618 of display area 606. Center portion 614 can be defined as the portion of display area 606 between upper buffer 610 and lower buffer 612.

It will be appreciated that the above discussed designations and areas are defined with respect to the perspective of the user of device 604. Thus, rotation of device 604 can result different physical areas of display area 606 being treated as upper buffer 610, lower buffer 612, and center portion 614.

According to an aspect of the present disclosure, the scale of map 602 provided on display area 606 can be adjusted based upon a speed horizon, an event horizon, and a traffic horizon respectively providing first, second, and third distances. For example, the scale of map 602 can be adjusted to reflect the minimum of the first, second, or third distances.

As an example, the scale of map 602 can be adjusted to reflect such minimum distance by either increasing or decreasing the scale of map 602 such that the portion of the map depicted between a current position of the device (indicated by device location indicator 608) and upper boundary 616 of display area of the navigational device is equivalent to such minimum distance.

As another example, the scale of map 602 can be adjusted to reflect the minimum distance by either increasing or decreasing the scale of map 602 such that the portion of the map depicted between the current position of the device (indicated at 608) and a lower edge of upper buffer 610 (i.e. upper edge of center portion 614 is equivalent to such minimum distance.

For example, a minimum distance 620 can be described by a speed horizon. More particularly, distance 620 can have been calculated by entering the current speed at which device 604 is travelling into a speed function. The speed function can output distance 620 based on the inputted current speed.

Thus, the scale of map 602 can be adjusted to reflect distance 620 by increasing or decreasing the scale of map 602 such that the portion of the map between the current location of the device (indicated at 608) and the intersection of center portion 614 with upper buffer 610 depicts an amount of real world geography equivalent to distance 620, as shown in FIG. 6.

As another example, the scale of map 602 can be adjusted to reflect a minimum distance provided by a speed horizon, an event horizon, and a traffic horizon by increasing or decreasing the scale of map 602 such that a particular location is depicted generally in an upper portion of display 606. Thus, in some implementations, the scale of the map is either increased or decreased simply as a result of selecting a particular geographic area to depict.

For example, a minimum distance 622 can be described by a traffic horizon. More particularly, minimum distance 622 can be the travel-based distance between the current location of the device (indicated at 608) and a location 624 at which a traffic condition exists.

Thus, the scale of map 602 can be adjusted to reflect distance 622 by either increasing or decreasing the scale of map 602 such that location 624 is depicted generally in an upper portion of display 606. For example, as shown in FIG. 6, location 624 can be depicted at a lower edge of upper buffer 610. Alternatively, location 624 can be depicted at upper boundary 616 of display area 606.

It will be appreciated that various other methods are possible for adjusting the scale of a map such that it reflects a particular distance. Any of such methods can be used to satisfy the present disclosure. Generally, however, a scale of a map will reflect a particular distance if the map depicts the information that contributed to such distance being identified as meaningful to a user of the navigational device.

Figure 7:
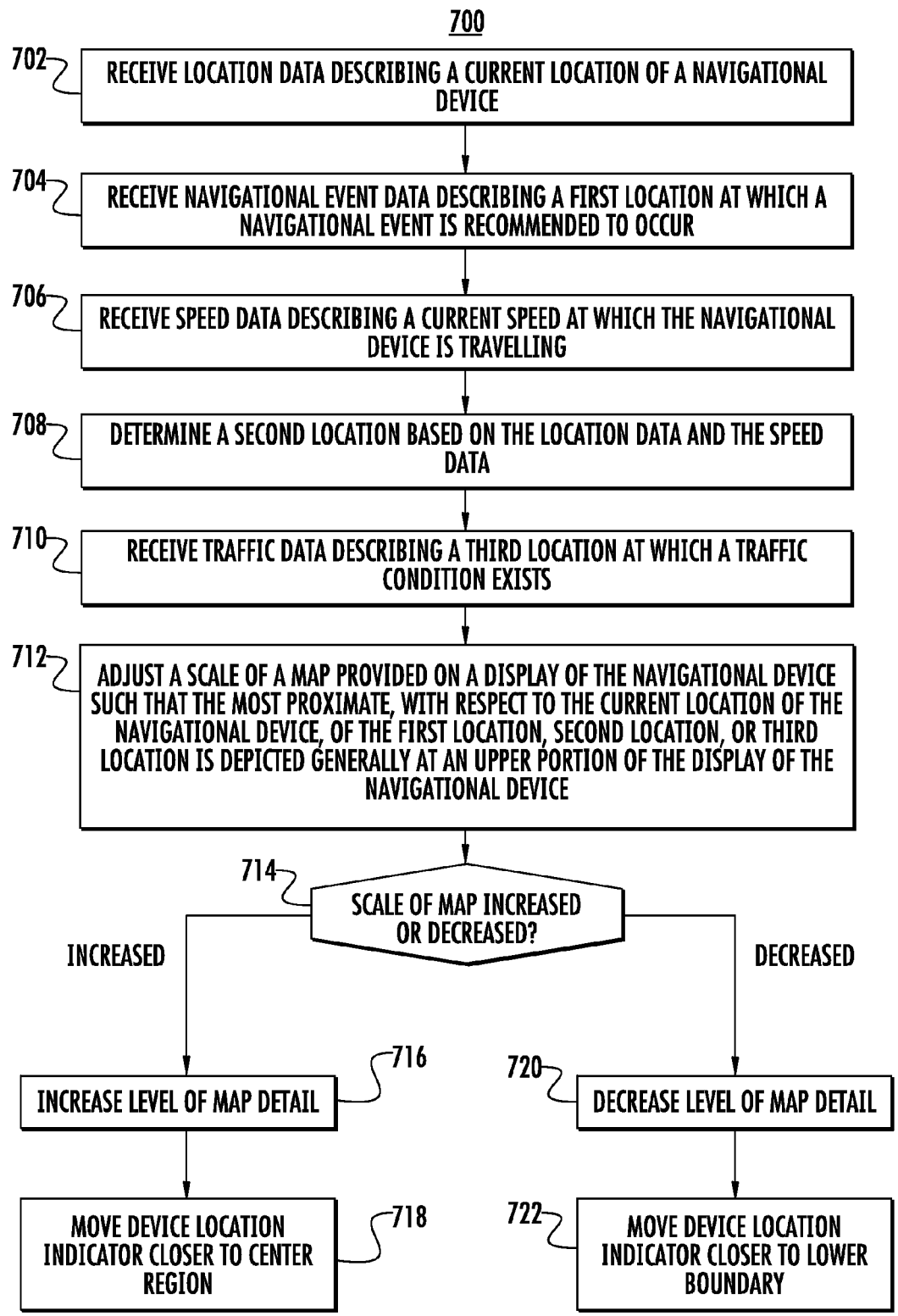
FIG. 7 depicts an exemplary method for displaying navigational information on a display of a navigational device according to an exemplary embodiment of the present disclosure.

FIG. 7 depicts a flowchart of an exemplary method (700) for displaying navigational information on a display area of a navigational device according to an exemplary embodiment of the present disclosure. While method (700) will be discussed with reference to navigational system 200 of FIG. 2, method (700) can be implemented using any suitable navigational device or system. In addition, FIG. 7 depicts steps performed in a particular order for purposes of illustration and discussion. Those of ordinary skill in the art, using the disclosures provided herein, will understand that the various steps of any of the methods disclosed herein can be omitted, adapted, and/or rearranged in various ways.

At (702) location data can be received that describes a current location of a navigational device. For example, positioning system 220 can provide location data describing the current location of navigational device 210.

At (704) navigational event data can be received that describes a first location at which a navigational event is recommended to occur. For example, navigational device 210 can send a request for navigational instructions to server 230 over network 250. Such request can specify a destination, an origin, and optionally the location data received at (702). In response, server 230 can determine a set of navigational instructions and provide them to navigational device 210. Alternatively, navigational device 210 can implement application module 216 to determine the navigational instructions independently of server 230.

In either case, the navigational instructions can specify a plurality of locations at which a plurality of navigational events (e.g. driving maneuvers) are respectively recommended to occur. The first location can be the most proximate location at which a yet unfulfilled navigational event is scheduled to occur.

At (706) speed data can be received that describes a current speed at which the navigational device is travelling. For example, a vehicle associated with navigational device 210 can provide navigational device 210 with such speed data. As another example, processor(s) 212 can generate the speed data at (706) by analyzing location data received over time.

At (708) a second location can be determined based on the location data and the speed data. For example, processor(s) 212 can input the current speed received at (706) into a speed formula and can receive a distance as a result. The second location can be determined at (708) based on such distance and the current location of the navigational device received at (702).

For example, the second location can be determined at (708) by advancing along the planned route of travel by an amount of travel equal to the distance output by the speed formula. As another example, the second location can be determined at (708) by advancing according to a current heading of navigational device 210 by an amount equal to the distance output by the speed formula.

At (710) traffic data can be received that describes a third location at which a traffic condition exists. For example, server 230 can access traffic database 240 to obtain real-time traffic data and can provide such traffic data to navigational device 210 over network 250. The received traffic data can describe a plurality of locations at which traffic conditions respectively exist. Processor(s) 212 can analyze the received traffic data to determine the most proximate point along the planned route of travel at which one of such traffic conditions exists. Such most proximate point can be the third location.

At (712) a scale of a map provided on a display of the navigational device can be adjusted. In particular, the scale of the map can be adjusted such that the most proximate, with respect to the current location of the navigational device, of the first, second, or third locations is depicted generally at an upper portion of the display of the navigational device.

As an example, if the third location at which the traffic condition exists is the most proximate of the first, second, and third locations, then the scale of the map can be adjusted such that the third location is depicted generally at an upper portion of the device display.

For example, the most proximate location can be depicted at an upper boundary of the device display. As another example, the most proximate location can be depicted at a lower edge of an upper buffer portion of the device display.

At (714) it is determined whether the scale of the map was increased or decreased at (712). If it is determined at (714) that the scale of the map was increased at (712), then at (716) the level of detail of the map can be increased. Further, at (718) a device location indicator can be moved closer to a center region of the device display.

However, if it is determined at (714) that the scale of the map was decreased at (712), then at (716) the level of detail of the map can also be decreased. Further, the device location indicator can be moved closer to a lower boundary of the device display.

It will be appreciated that, in some implementations, (712)-(718) or (712)-(722) can be performed in concert or otherwise grouped such that only a single adjustment of the scale of the map is performed for each instance in which method (700) is performed.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A navigational device for providing navigational instructions, the navigational device comprising:
   one or more processors;
   a memory;
   a user interface including a display;
   a positioning system for determining a current position of the navigational device; and
   a network interface for receiving data from a remote computing device;
   wherein the one or more processors are configured to determine:
     a first distance that can be travelled over a period of time at a current speed at which the navigational device is travelling;
     a second distance between the current position of the navigational device and a first location at which a driving maneuver should be performed according to the navigational instructions; and
     a third distance between the current position of the navigational device and a second location at which a traffic condition exists, the second location being located along a route of travel suggested by the navigational instructions;

and, wherein the one or more processors are further configured to determine a minimum distance of the first, second, and third distances, and to adjust a scale of a map displayed on the display, such that the scale of the displayed map corresponds to the determined minimum distance.

2. The navigational device of claim 1, wherein the processor calculates each of the first, second, and third distances prior to adjusting the scale of the map.

3. The navigational device of claim 2, wherein the data received from the remote computing device via the network interface comprises traffic data describing the second location at which the traffic condition exists.

4. The navigational device of claim 1, wherein:
the traffic condition comprises a high volume of traffic; and
the second location at which the traffic condition exists comprises the most proximate, with respect to the navigational device, point along the route of travel at which the traffic condition exists.

5. The navigational device of claim 4, wherein the processor further adjusts, when prompted via the user interface, the scale of the map to reflect a fourth distance between the current position of the navigational device and a third location at which the traffic condition exists, the third location being the least proximate, with respect to the navigational device, point along the route of travel at which the traffic condition exists.

6. The navigational device of claim 1, wherein the processor further adjusts a level of detail of the map based on the minimum of the first, second, and third distances.

7. The navigational device of claim 1, wherein:
the navigational device determines a road category associated with a roadway currently being travelled; and
the processor adjusts a level of detail of the map based on the road category and the minimum of the first, second, and third distances.

8. The navigational device of claim 1, wherein the processor further adjusts a position of an indicator provided on the display based on the minimum of the first, second, and third distances, the indicator indicating the current location of the navigational device relative to the displayed map.

9. The navigational device of claim 8, wherein the processor adjusts the position of the indicator provided on the display based on the minimum of the first, second, and third distances by performing operations comprising:
moving the position of the indicator towards a center region of the display when the scale of the map is increased to reflect the minimum of the first, second, and third distances; and
moving the position of the indicator towards a lower boundary of the display when the scale of the map is decreased to reflect the minimum of the first, second, and third distances.

10. The navigational device of claim 1, wherein:
the navigational device determines a road category associated with a roadway currently being travelled; and
the processor adjusts a position of an indicator provided on the display based on the determined road category and the minimum of the first, second, and third distances, the indicator indicating the current location of the navigational device relative to the displayed map.

11. A computer-implemented method for displaying navigational information on a display area of a navigational device, the method comprising:
calculating, by one or more computing devices, a speed horizon based on the speed of a vehicle associated with the navigational device, the speed horizon describing a first distance that can be travelled over a period of time at the speed of the vehicle;
calculating, by the one or more computing devices, an event horizon describing a second distance to a recommended driving maneuver associated with an upcoming navigational instruction; and
calculating, by the one or more computing devices, a traffic horizon describing a third distance to a region of traffic congestion;
determining, by the one or more computing devices, a minimum distance associated with the plurality of horizons; and
adjusting, by the one or more computing devices, a scale of a map provided on the display area based on the minimum distance associated with the plurality of horizons, such that the portion of the map provided on the display area generally reflect the minimum distance.

12. The computer-implemented method of claim 11, wherein calculating the speed horizon comprises entering the speed of the vehicle into a speed function, the speed function providing the first distance as a function of the speed of the vehicle.

13. The computer-implemented method of claim 11, wherein calculating the speed horizon comprises calculating an expected difference in location over a predetermined period of time given the speed of the vehicle and a planned route of travel, the expected difference being the first distance.

14. The computer-implemented method of claim 11, further comprising adjusting a level of detail of the map based on the determined minimum of the first distance, the second distance, and the third distance.

15. The computer-implemented method of claim 11, further comprising adjusting a position of an indicator relative to the display area based on the determined minimum of the first distance, the second distance, and the third distance, the indicator indicating the position of the navigational device with respect to the map.

16. One or more tangible, non-transitory computer-readable media storing computer-readable instructions that when executed by one or more processors cause the one or more processors to perform operations, the operations comprising:
receiving location data describing a current location of a navigational device;
receiving navigational event data describing a first location at which a navigational event is recommended to occur;
receiving speed data describing a current speed at which the navigational device is travelling;
determining a second location based on the location data and the speed data;
receiving traffic data describing a third location at which a traffic condition exists;
determining a most proximate location, with respect to the current location of the navigational device, of the first location, second location, or third location;
adjusting a scale of a map provided on a display of the navigational device such that the the most proximate distance is depicted generally in an upper portion of the display of the navigational device.

17. The one or more tangible, non-transitory computer-readable media of claim 16, wherein determining a second location based on the location data and the speed data comprises:
computing a distance by entering the current speed into a speed formula, the speed formula providing the distance as a function of speed; and determining the second location based on the current location of the navigational device and the first distance.

18. The one or more tangible, non-transitory computer-readable media of claim 16, wherein determining a second location based on the location data and the speed data comprises determining an expected location that the navigational device will reach in a predetermined period of time based on the current speed, the current location, and routing data describing expected travel times associated with a planned route of travel, the expected location being the second location.

19. The one or more tangible, non-transitory computer-readable media of claim 16, wherein adjusting the scale of the map provided on the display of the navigational device such that the most proximate, with respect to the current location of the navigational device, of the first location, second location, or third location is depicted generally in an upper portion of the display of the navigational device comprises adjusting the scale of the map such that the most proximate, with respect to the current location of the navigational device, of the first location, second location, or third location is depicted at a lower edge of an upper buffer portion of the display, the upper buffer including a predetermined area below an upper boundary of the display.

* * * * *